United States Patent [19]

Hardy et al.

[11] Patent Number: 5,701,956
[45] Date of Patent: Dec. 30, 1997

[54] METHODS AND COMPOSITIONS FOR REDUCING WATER PRODUCTION FROM SUBTERRANEAN FORMATIONS

[75] Inventors: Mary Anne Hardy, Oud Ade, Netherlands; O. Marlene Isenberg, Duncan, Okla.

[73] Assignee: Halliburton Energy Services, Inc., Duncan, Okla.

[21] Appl. No.: 632,790

[22] Filed: Apr. 17, 1996

[51] Int. Cl.$^6$ ............................................. E21B 33/138
[52] U.S. Cl. ........................ 166/295; 166/294; 507/211; 507/216; 507/225; 507/237; 507/903; 523/130
[58] Field of Search ........................... 166/294, 295, 166/305.1; 405/264; 507/211, 216, 225, 237, 903; 523/130

[56] References Cited

U.S. PATENT DOCUMENTS

| | | | |
|---|---|---|---|
| 4,664,713 | 5/1987 | Almond et al. | 106/209 |
| 4,799,550 | 1/1989 | Harris et al. | 166/300 |
| 4,982,793 | 1/1991 | Holtmyer et al. | 166/305.1 |
| 5,067,565 | 11/1991 | Holtmyer et al. | 166/305.1 |
| 5,146,986 | 9/1992 | Dalrymple | 166/294 |
| 5,161,615 | 11/1992 | Hutchins et al. | 166/295 |
| 5,181,568 | 1/1993 | McKown et al. | 166/293 |
| 5,304,620 | 4/1994 | Holtmyer et al. | 527/310 |
| 5,335,726 | 8/1994 | Rodrigues | 166/295 |
| 5,346,013 | 9/1994 | Pusch et al. | 166/295 |
| 5,363,916 | 11/1994 | Himes et al. | 166/276 |
| 5,379,841 | 1/1995 | Pusch et al. | 166/305.1 X |
| 5,439,057 | 8/1995 | Weaver et al. | 166/295 |

Primary Examiner—George A. Suchfield
Attorney, Agent, or Firm—Robert A. Kent; Clark Dougherty, Jr.

[57] ABSTRACT

The present invention relates to methods and compositions for reducing the production of water from water and oil producing subterranean formations. The methods basically comprise the introduction of an aqueous polymer composition into the water producing zones of the formation which cross-links after being placed therein. The compositions of the invention are comprised of a heavy brine and a graft copolymer of a hydrophilic polymer and a phosphonate.

14 Claims, No Drawings

METHODS AND COMPOSITIONS FOR REDUCING WATER PRODUCTION FROM SUBTERRANEAN FORMATIONS

BACKGROUND OF THE INVENTION

1. Field of the Invention

The present invention relates generally to methods and compositions for reducing the production of water from subterranean zones, and more particularly, to improved methods of reducing the production of water from subterranean formations which produce both water and oil.

2. Description of the Prior Art

The production of salt water with oil and/or gas from wells constitutes a major problem and expense in the production of oil and gas. While oil and gas wells are usually completed in hydrocarbon producing zones, if there is a water bearing zone adjacent to the hydrocarbon producing zone, the higher mobility of the water often allows it to flow into the hydrocarbon producing zone by way of natural fractures and high permeability streaks. In the production of such wells, the ratio of water to hydrocarbons recovered often becomes so high that the cost of producing the water, separating it from the hydrocarbons and disposing of it represents a significant economic loss.

In order to reduce the production of water from water and hydrocarbon producing formations, viscous aqueous polymer solutions have been utilized heretofore. That is, aqueous polymer solutions have been pumped into water and hydrocarbon producing formations so that they enter water zones within and adjacent to the formations and cross-link therein. The cross-linking of the polymer solutions causes them to form stiff gels which stop or at least reduce the flow of water through the natural fractures and high permeability streaks in the formations.

While the use of aqueous polymer solutions for reducing the production of formation water has achieved varying degrees of success, the lack of strength of some of the heretofore use cross-linked polymers cause them to deteriorate over time necessitating the performance of additional treatments. In addition, the locations of prior aqueous polymer solutions when they cross-link have often been inexact whereby the permeabilities of oil and gas zones as well as water producing zones have been reduced. Thus, there is a continuing need for improved methods and compositions for reducing the production of water from subterranean zones and formations without incurring the above mentioned problems and high costs.

SUMMARY OF THE INVENTION

The present invention provides improved methods and compositions for reducing water production from subterranean formations. The methods basically comprise introducing into the water producing zones of a subterranean formation an aqueous polymer composition which cross-links after being placed therein. The cross-linking takes place as a result of the polymer solution being in contact with and dissolving alkaline materials containing divalent metals from the formation. Upon cross-linking, the aqueous polymer composition significantly reduces the water produced from the formation.

The novel aqueous polymer compositions of this invention, when introduced into a water and oil producing subterranean formation, cross-link after dissolving alkaline formation materials and being contacted by formation water but do not cross-link when contacted by oil. The compositions are basically comprised of brine and a graft copolymer of a hydrophilic polymer and a phosphonate. Such graft copolymers are prepared by a redox reaction between phosphonate monomers or polymers and the hydrophilic polymer.

It is, therefore, a general object of the present invention to provide improved methods and aqueous polymer compositions for reducing water production from subterranean formations.

Other and further objects, features and advantages of the present invention will be readily apparent to those skilled in the art upon a reading of the description of preferred embodiments which follows.

DESCRIPTION OF THE PREFERRED EMBODIMENTS

As mentioned, in accordance with the methods of the present invention for reducing the production of water from a water and oil producing subterranean formation, an aqueous polymer composition is introduced into the formation which cross-links after being placed therein. This occurs as a result of the aqueous polymer composition having to dissolve alkaline materials containing divalent metals from the formation in order to be cross-linked. The alkaline materials which facilitate cross-linking of the aqueous polymer compositions include basic materials such as calcium oxide, magnesium oxide, calcium carbonate and the like. As will be described further hereinbelow, when a heavy saturated brine is utilized for forming the aqueous polymer composition, the composition will not cross-link even after dissolving the above described types of basic materials until the composition is contacted by formation water. Thus, when the composition is placed in an oil producing zone, cross-linking will not occur unless and until the polymer composition contacts formation water in that zone. The term "heavy brine" is used herein to mean a saturated brine having a density of about 15 lb/gal or higher. When the aqueous polymer composition is formed in a light unsaturated brine and the above types of basic materials are dissolved therein, if crosslinking occurs in an oil bearing zone, the permeability of the zone to oil is decreased less than the permeability of the zone to water.

The aqueous polymer compositions which are useful in accordance with this invention are basically comprised of an aqueous salt solution and a graft copolymer of a hydrophilic polymer and a phosphonate. Examples of particularly suitable hydrophilic polymers are polyacrylamide and copolymers containing acrylamide, partially hydrolyzed polyacrylamide and related copolymers, hydroxyalkylcelluloses, guar gum and derivatives thereof and other similar hydrophilic polymers. The term "phosphonate" is used herein to mean phosphonic acid monomers and polymers including vinyl phosphonic acid monomers and polymers and aqueous soluble salts thereof such as sodium or potassium phosphonates. The phosphonate in the graft copolymer crosslinks with the divalent metals in alkaline formation materials at pH levels above 7 and readily attaches to rock surfaces.

The term "aqueous salt solution" is used herein to mean an aqueous salt solution containing one or more salts such as sodium chloride, potassium chloride, calcium chloride, sodium bromide, calcium bromide, ammonium chloride, tetramethylammonium chloride and the like. The aqueous salt solution utilized is preferably a brine having a density in the range of from about 8.35 lb/gal to about 19.1 lb/gal. As mentioned above, when a heavy brine is utilized to form the aqueous polymer composition of this invention, e.g., a calcium chloride-calcium bromide brine having a density of about 15.2 lb/gal, the aqueous polymer composition must both dissolve basic compounds from the formation in which it is placed and contact formation water, i.e., formation salt water, before cross-linking takes place.

The preferred cross-linkable graft copolymer for use in accordance with this invention is a hydroxyalkylcellulose having vinyl phosphonate monomers or polymers grafted thereto. The hydroxyalkylcellulose preferably has a hydroxyalkyl molar substitution from about 1.5 to about 3.0. The term "molar substitution" is defined as the average number of moles of hydroxyalkyl substituent present per anhydrogluclose unit of the cellulose material. The alkyl group of the hydroxyalkylcellulose can be ethyl, propyl and mixtures thereof. Preferably, the hydroxyalkylcellulose is hydroxyethylcellulose (HEC) having a molar substitution in the range of from about 1.8 to about 2.5. Hydroxyethylcellulose is commercially available and is usually formed by reacting ethylene oxide with cellulose under extreme alkaline conditions.

The graft copolymers of hydroxyalkylcellulose and vinyl phosphonate can be prepared utilizing several techniques. In one technique, a graft copolymer is prepared using a redox system comprising ceric ions and nitric acid. The generalized reaction is believed to be represented by the formula:

$$Ce^{IV} + RCH_2OH \rightleftharpoons B \rightarrow Ce^{III} + H^+ + RCH_2O\cdot$$

where B is a ceric-alcohol complex, $RCH_2OH$ is the cellulose derivative and $RCH_2O\cdot$ is a free radical. The polymerization chemical initiator of ceric ions in nitric acid oxidizes 1,2-glycols with the formation of a free radical on the cellulose derivative reducing agent. The free radical produced on the cellulose derivative initiates polymerization with the vinyl group of vinyl phosphonate to produce the graft copolymer. Typically, the graft copolymerizations are carried out in aqueous media wherein the polymer is dissolved or dispersed. The graft copolymers have been prepared in acetone (55% to 90%) and water or methanol (about 70%) and water. Reactions were carried out in a 1 liter kettle with a stirrer or a 1 liter jar at about 20° C. to about 60° C. The ratio of cellulose derivative to aqueous medium ranges from about 1 gram per 100 milliliters to about 1 gram per 2 milliliters. The preferred ratio is from about 1 gram per 6 milliliters to 1 gram per 4 milliliters. The ratio of cellulose derivative to grafted vinyl phosphonate substituent ranges from about 3 grams per milliliter to about 25 grams per milliliter. The preferred ratio is from about 6 grams per milliliter to about 16 grams per milliliter.

The ceric ions utilized for the polymerization initiator may be provided, for example, by salts such as ceric nitrate, ceric sulfate, ceric ammonium nitrate and ceric ammonium sulfate. The preferred ceric initiator of the present invention is a solution of ceric ammonium nitrate in 1N nitric acid. Ceric ammonium nitrate should be present in an amount of from about 0.00075 mole per 100 milliliter to about 0.005 mole per 100 milliliter reaction medium. The ceric initiator may be added slowly to the reaction material over a time period of about 30 to 90 seconds or longer. Reaction times vary from about 10 minutes to about 20 hours depending on reaction conditions or the particular grafted monomer. Grafting reaction efficiency is generally less than about 50%. After the reaction is complete, the polymerization product is washed with acetone, filtered and dried.

In another technique for preparing the graft copolymer, a redox system comprising the reaction product of hydrogen peroxide with a ferrous salt is utilized. The generalized redox reaction is believed to be represented by the formula:

$$H_2O_2 + Fe^{+2} \rightarrow HO\cdot + HO^- + Fe^{+3}$$

and the generalized initiation reaction is believed to be represented by the general formula:

$$RCH_2OH + HO\cdot \rightarrow H_2O + RCH_2O\cdot$$

An advantage of this initiator is that radical production occurs at a reasonable rate over a wide temperature range whereby the reactions can be carried out at room temperature if desired. The free radical produced on the cellulose derivative initiates polymerization with the vinyl group of the vinyl phosphonate to produce the graft copolymer. Graft copolymers were prepared utilizing this technique in acetone/water mixtures containing from about 55% to about 90% acetone. The polymerization reactions were carried out in a 1 liter kettle with a stirrer or a 1 liter jar at a temperature of from about 20° C. to about 60° C. The ratio of cellulose derivative to aqueous medium ranged from about 1 gram per 100 milliliters to about 1 gram per 2 milliliters. The preferred ratio is from about 1 gram per 2 milliliters to 5 milliliters. The ratio of cellulose derivative to vinyl phosphonate monomer ranged from about 5 to about 40 grams per 1 gram of monomer. The preferred ratio is from about 6 to about 16 grams per 1 gram of monomer.

The ferrous ions utilized in this preparation procedure may be provided, for example, by salts such as ferrous ammonium sulfate, ferrous chloride, ferrous sulfate, ferrous acetate, ferrous oxalate, ferrous acetylacetonate and the like. A preferred source of ferrous ions is ferrous ammonium sulfate. Alternatively, other commonly used metal ion reactants may be utilized in place of the ferrous ions to generate the free radicals necessary to effect grafting and other forms of hydrogen peroxide such as T-butyl-hydroperoxide can be used. The hydrogen peroxide-ferrous salt initiator may be added slowly to the reaction material over a time period of about 30 to 90 seconds or longer. Reaction times vary from about 15 minutes to about 4 hours depending upon the reaction conditions. Grafting reaction efficiency (% of monomer grafted) is generally less than about 75%. After the reaction is complete, the polymerization product is washed with acetone, filtered and dried.

In a preferred method of effecting the graft polymerization, the polymerization media used is a polyglycol in which the graft copolymer product can be retained in a substantially storage stable slurry form. Typically, the media comprises a polyglycol, such as polypropylene glycol having a molecular weight up to about 1,000, various polyethylene glycols and homopolymers of 1,2-butylene oxide having a molecular weight of from about 200 to about 400 which are present in an amount of from about 70% to about 95% by weight of the media and the remainder generally being water. The media also may comprise tetramethyl ammonium chloride in a similar amount or in admixture with a polyglycol. Preferably, the polyglycol comprises from about 86% to about 92% by weight of the media.

The polymerization reactions can be carried out in a 5 liter kettle with a stirrer at a temperature of from about 20° C. to about 60° C. The ratio of cellulose derivative to media can range from about 1 gram per 100 milliliters to about 1 gram per 2 milliliters. The preferred ratio is from about 1 gram per 2 to 5 milliliters. The media can also include a quantity of a dispersant or thixotropy such as alkyl quaternary ammonium montmorillonite or dimethyldicocoammonium chloride to facilitate dispersion of the polymer in the media and improve suspension properties. The grafting reaction is performed as previously described using an appropriate redox system such as the ferrous salt with a source of peroxide described above. Since the metal ions are not removed from the product by washing as when a dry product is formed, a sequestrant for the metal ions may be added to the slurry at the conclusion of the reaction. The polymerization product remains dispersed or suspended in the media over a period of time facilitating storage and handling.

When the graft hydroxyalkylcellulose-vinyl phosphonate copolymer is dissolved in an aqueous salt solution, the viscosity of the resulting solution increases. However, the viscosity is not so high that the resulting aqueous polymer composition can not be pumped into an oil and/or water permeable subterranean formation or zone. As mentioned above, after the aqueous polymer composition has been placed in the formation or zone, it slowly dissolves alkaline compounds from the materials making up the formation or zone which subsequentially cause the polymer in the aqueous polymer composition to cross-link. When cross-linking takes place, a highly viscous gel is formed which plugs or at least partially plugs the permeability of the formation or zone thereby preventing or reducing the production of water from the formation or zone.

As also mentioned above, when the aqueous polymer composition is formed using a heavy brine the resulting aqueous polymer composition will not cross-link after being placed in a permeable subterranean formation or zone and after one or more alkaline compounds from the formation have been dissolved therein until the aqueous polymer composition contacts formation water. That is, even though the dissolved alkaline materials activate and cause cross-linking in the aqueous polymer compositions formed with light salt solutions or brines, when heavy brines are utilized, cross-linking does not take place until the aqueous polymer solution containing dissolved alkaline materials is contacted by formation water, i.e., salt water produced from or through the formation.

The graft copolymer is generally present in the aqueous polymer compositions useful in accordance with this invention in an amount in the range of from about 0.24% to about 2.4% by weight of aqueous salt solution in the composition.

A particularly preferred heavy brine polymer composition, which when introduced into a water and oil producing subterranean formation cross-links when contacted by formation water but does not cross-link when contacted by oil, is comprised of an aqueous calcium chloride-calcium bromide brine having a density of about 15.2 lb/gal and a graft copolymer of hydroxyethylcellulose and vinyl phosphonate, the graft copolymer being present in the composition in an amount in the range of from about 0.36% to about 1.0% by weight of the brine therein.

A preferred method of this invention utilizing the above described heavy brine polymer composition is comprised of the steps of introducing the polymer composition into a water and oil producing subterranean formation whereby the composition dissolves alkaline compounds such as magnesium oxide, calcium oxide and the like, and then producing the formation so that the aqueous polymer composition cross-links in water producing zones in the formation as a result of being contacted by formation water thereby reducing the water production from the formation. The Method also may include preflushing the zone of the subterranean formation to be treated with heavy brine. The heavy brine preferably comprises a calcium chloride-calcium bromide brine having a density of about 15.2 lb/gal.

In order to further illustrate the methods and compositions of the present invention, the following examples are given.

EXAMPLE 1

Tests were conducted to determine the residual resistance factor (RRF) of cores using the methods and polymer compositions of the present invention. The cores were taken from a North Sea well and were tested using a Hassler core test cell. For each test, a 2.54 cm diameter by 8 to 9 cm length core was loaded into the cell and the cell was heated to 123° C. A pressure was applied to the cylindrical sides of the core being tested at a level of about 200 to 300 psi over the axial fluid pressure applied to the core. A back pressure was set at about 300 to 350 psig.

A first test core was subjected to a water-wet test procedure as follows:

1. The core was saturated with North Sea water.

2. Formation crude was flowed through the core at a constant pressure until the flow rate stabilized.

3. The initial permeability to brine was measured at constant flow rate.

4. Steps 2 and 3 were repeated two more times. Brine was the last fluid injected through the core.

5. A 250–300 ml quantity of an aqueous polymer composition ("Composition A") comprised of seawater and a graft copolymer of hydroxyethylcellulose (HEC) and a vinyl phosphonate present in an amount of 0.5% by weight of the seawater containing a magnesium chloride additive in an amount of 3,600 ppm (simulating formation alkaline compounds) was flowed through the core. The maximum flow rate was either 20 ml/min or a flow rate that corresponded to 1,000 psig maximum injection pressure. After 200 ml of the polymer composition was flowed through the core, a sample of the exiting polymer composition was sealed in a vial with fresh formation sand and placed in an oven preheated to 123° C.

6. The core was shut-in in the test cell for 3 hours after the sample from step 5 had gelled.

7. The treated permeability of the core to brine was measured at the same flow rate as in step 3.

8. Formation crude was flowed through the core at the same pressure as step 2.

A second core was subjected to an oil wet test procedure as follows:

1. The core was saturated with North Sea water.

2. Formation crude was flowed through the core at a constant pressure until the flow rate stabilized.

3. The initial permeability to brine was measured at a constant flow rate.

4. Steps 2 and 3 were repeated 2 more times. Oil was the last fluid injected through the core.

5. 250–300 ml of the aqueous polymer composition of this invention as described above (Composition A) but also including a gel stabilizer in an amount of 3,600 ppm was flowed through the core. The maximum flow rate was either 20 ml/min or a flow rate that corresponds to 1,000 psi maximum injection pressure. After 200 ml of the polymer composition was flowed through the core, a sample of the exiting polymer composition was sealed in a vial with fresh formation sand and placed into an oven preheated to 123° C.

6. The core was shut-in for 3 hours after the sample from step 5 had gelled.

7. The treated permeability to oil was measured at the same flow rate as in step 3.

8. Formation crude was flowed through the core at the same pressure as in step 2.

The results of the tests were measured in residual resistance factor (RRF) where:

$$RRF = \frac{\text{permeability before treatment}}{\text{permeability after treatment}}$$

The results of these tests are shown in Table I below.

TABLE I

WATER AND OIL PERMEABILITY REDUCTION TESTS USING AQUEOUS POLYMER COMPOSITION A[1]

| Aqueous Salt Solution in Composition | Quantity of Polymer in Composition, % by wt. of Salt Solution | Quantity of Magnesium Chloride[2] in Composition, ppm by wt. of Brine | Quantity of Gel Stabilizer in Composition, ppm by wt. of Brine | $RRF_{brine}$[3] | $RRF_{oil}$[4] |
|---|---|---|---|---|---|
| Seawater | 0.5 | 3600 | 0 | 28 | 4 |
| Seawater | 0.5 | 3600 | 3600 | 32 | 4.5 |

[1]Basic composition comprised of seawater and a graft copolymer of HEC and vinyl phosphonate.
[2]$MgCl_2 \cdot 6H_2O$ (simulating alkaline formation materials containing divalent metals)

[3]$RRF_{brine} = \frac{\text{initial permeability to brine}}{\text{final permeability to brine}}$

[4]$RRF_{oil} = \frac{\text{initial permeability to oil}}{\text{final permeability to oil}}$

EXAMPLE 2

The tests described in Example 1 above were repeated except that the aqueous polymer composition ("Composition B") was comprised of a saturated calcium chloride/calcium bromide brine having a density of 15.2 lb/gal containing the graft copolymer described in Example 1 above in an amount of 0.36% by weight of the brine and magnesium oxide additive in an amount of 0.24% by weight of the brine.

The results of these tests are set forth in Table II below.

TABLE II

WATER AND OIL PERMEABILITY REDUCTION TESTS USING AQUEOUS POLYMER COMPOSITION B[1]

| Aqueous Salt Solution in Composition | Quantity of Polymer in Composition, % by wt. of Salt Solution | Quantity of Magnesium Chloride[2] in Composition, % by wt. of Brine | Quantity of Gel Stabilizer in Composition, ppm by wt. of Brine | $RRF_{brine}$[3] | $RRF_{oil}$[4] |
|---|---|---|---|---|---|
| Calcium Chloride-Calcium Bromide Brine[5] | 0.36 | 0.24 | 0 | 21 | 4.0 |
| Calcium Chloride-Calcium Bromide Brine[5] | 0.36 | 0.24 | 0 | 15 | 3.1 |

[1]Basic composition comprised of $CaCl_2/CaBr_2$ brine and a graft copolymer of HEC and vinyl phosphonate.
[2]MgO (simulating alkaline formation materials containing divalent metals)

[3]$RRF_{brine} = \frac{\text{initial permeability to brine}}{\text{final permeability to brine}}$

[4]$RRF_{oil} = \frac{\text{initial permeability to oil}}{\text{final permeability to oil}}$

[5]Saturated $CaCl_2/CaBr_2$ brine having a density of 15.2 lb/gal.

The results of the tests given in Tables I and II above show very efficient water permeability reduction by the aqueous polymer compositions of this invention.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of reducing the production of formation water from a water producing subterranean zone comprising introducing into said zone an aqueous polymer composition which cross-links after being placed therein and contacting said formation water whereby water produced from said zone is substantially reduced, said composition being comprised of an aqueous salt solution and a graft copolymer of a hydrophilic polymer and a phosphonate.

2. The method of claim 1 wherein said hydrophilic polymer is selected from the group consisting of polyacrylamide and copolymers containing acrylamide, partially hydrolyzed polyacrylamide and related copolymers, hydroxyalkylcelluloses and guar gum and derivatives thereof.

3. The method of claim 2 wherein said hydrophilic polymer is hydroxyethylcellulose.

4. The method of claim 1 wherein the salt in said aqueous salt solution is selected from the group consisting of sodium chloride, potassium chloride, calcium chloride, sodium bromide, calcium bromide, ammonium chloride, tetramethylammonium chloride and mixtures of such salts.

5. The method of claim 1 wherein said aqueous salt solution is brine having a density in the range of from about 8.35 lb/gal to about 19.1 lb/gal.

6. The method of claim 1 wherein said graft copolymer is present in said composition in an amount in the range of from about 0.24% to about 2.4% by weight of said aqueous salt solution therein.

7. The method of claim 1 wherein said aqueous salt solution is a brine comprised of water, calcium chloride and calcium bromide.

8. The method of claim 7 wherein said brine has a density of about 15.2 lb/gal.

9. A method of reducing the production of water from a water and oil producing subterranean formation comprising introducing an aqueous polymer composition into said formation which cross-links when it contacts formation water but does not cross-link when it contacts oil, said composition being comprised of heavy brine and a graft copolymer of hydroxyethylcellulose and vinyl phosphonate.

10. The method of claim 9 wherein said graft copolymer is present in said composition in an amount in the range of from about 0.24% to about 2.4% by weight of said brine therein.

11. The method of claim 9 wherein said brine is a calcium chloride-calcium bromide brine having a density of about 15.2 lb/gal.

12. The method of claim 9 which further comprises the step of preflushing said zone with heavy brine.

13. A method of reducing the production of water from a water and oil producing subterranean formation comprising the steps of:

introducing an aqueous polymer composition into said formation which cross-links after dissolving alkaline formation materials and when it contacts formation water but does not cross-link when it contacts oil, said composition being comprised of calcium chloride-calcium bromide brine having a density of about 15.2 lb/gal and a graft copolymer of hydroxyethylcellulose and vinyl phosphonate present in said composition in an amount in the range of from about 0.36% to about 1.0% by weight of brine therein; and producing said formation so that said aqueous polymer composition cross-links in water producing zones in said formation thereby reducing the water production from said formation.

14. The method of claim 13 which further comprises the step of preflushing said zone with a calcium chloride-calcium bromide brine having a density of about 15.2 lb/gal.

* * * * *